Dec. 27, 1966     W. E. CUTTILL ET AL     3,293,855
REIGNITABLE ROCKET

Filed Oct. 16, 1963     3 Sheets-Sheet 1

INVENTORS
William E. Cuttill,
Cyril M. Hawkins,
James P. Kern,
Charles W. Schade &
Albert J. Sobey
BY Paul Fitzpatrick
ATTORNEY Dec. 27, 1966  W. E. CUTTILL ET AL  3,293,855
REIGNITABLE ROCKET Filed Oct. 16, 1963  3 Sheets-Sheet 2

INVENTORS
William E. Cuttill,
Cyril M. Hawkins,
James P. Kern,
Charles W. Schade &
Albert J. Sobey
BY Paul Fitzpatrick
ATTORNEY Dec. 27, 1966     W. E. CUTTILL ET AL     3,293,855

REIGNITABLE ROCKET

Filed Oct. 16, 1963     3 Sheets-Sheet 3

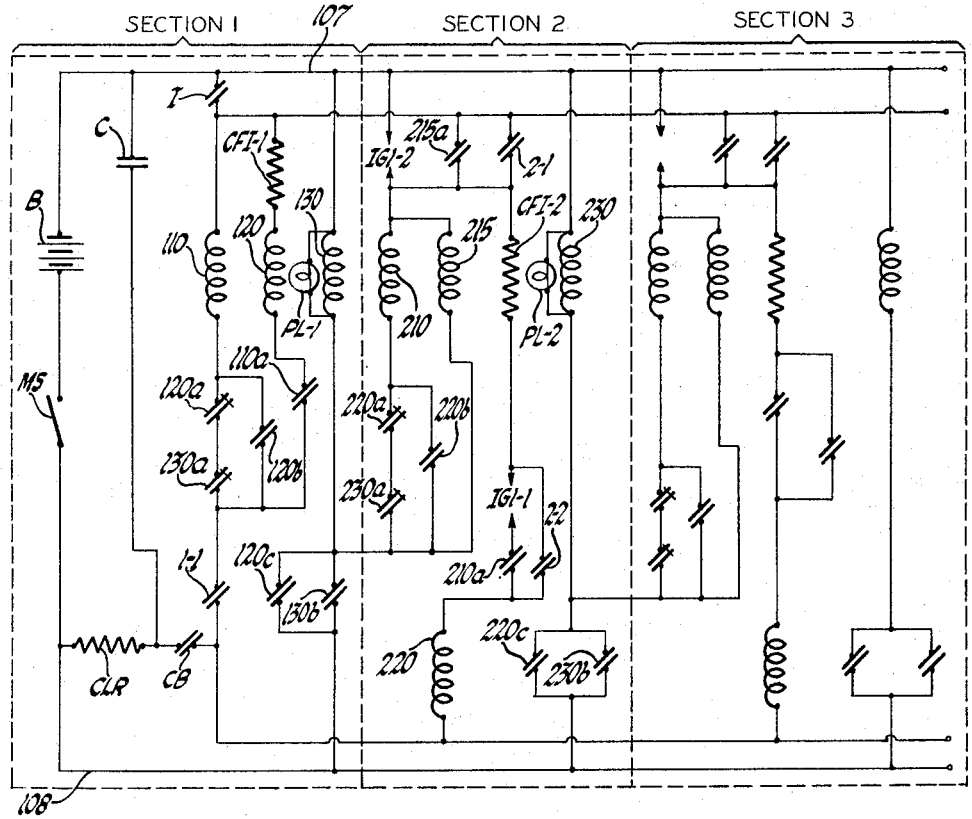

| SELECTOR SWITCH | | |
|---|---|---|
| POSITION | CONTACT | |
| | CB | I |
| TERMINATE | OPEN | OPEN |
| CONTINUE BURN | CLOSED | OPEN |
| IGNITE* | CLOSED | CLOSED |

*SPRING RETURN TO "CONTINUE BURN"

| MANUAL IGNITE SWITCHES | | |
|---|---|---|
| POSITION | CONTACT | |
| | Δ-"1" | Δ-"2" |
| OFF | OPEN | OPEN |
| ONE ▽ | CLOSED | OPEN |
| TWO ▽ | OPEN | CLOSED |

Δ SECTION NUMBER
▽ SPRING RETURN TO "OFF"

Fig.4

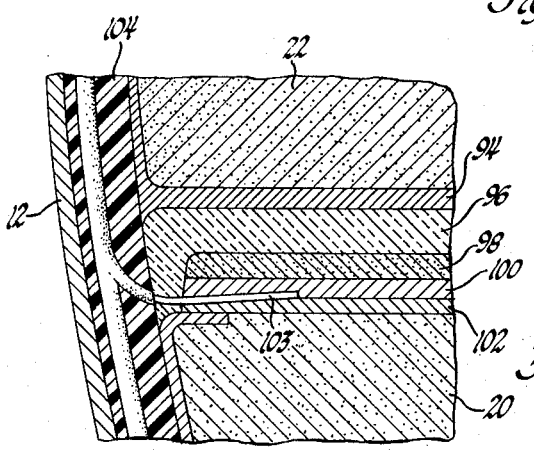

Fig.5

INVENTORS
*William E. Cuttill,*
*Cyril M. Hawkins,*
*James P. Kern,*
*Charles W. Schade &*
*Albert J. Sobey*

BY *Paul Fitzpatrick*
                ATTORNEY

United States Patent Office 3,293,855
Patented Dec. 27, 1966

3,293,855
REIGNITABLE ROCKET
William E. Cuttill, Fenton, Mich., Cyril M. Hawkins, James P. Kern, and Charles W. Schade, Indianapolis, Ind., and Albert J. Sobey, Birmingham, Mich., assignors to General Motors Corporation, Detroit, Mich., a corporation of Delaware
Filed Oct. 16, 1963, Ser. No. 319,089
15 Claims. (Cl. 60—229)

This invention relates to rocket engines and, more particularly, to a reignitable, solid propellant rocket engine which provides complete control over the quantity of fuel burned, the thrust level of the engine, and the vectoring of the thrust produced thereby.

Current solid propellant rocket engines usually contain one solid block of fuel; therefore, it is a problem in these solid propellant engines to control the thrust, since once the block of solid propellant is ignited, it burns completely. Thus, the entire propulsive capability of the rocket engine is spent during the combustion process of the one mass of fuel because once the fuel has been ignited the combustion cannot be stopped until the entire mass of fuel has been burned. To control the resultant thrust of solid propellant rocket engines, thrust cancellation valves have been adopted to bleed off combustion gas before it passes through the exhaust nozzles. But, of course, when the rocket engine contains just one large block of solid propellant the amount of combustion gas bled off through the cancellation valves can be great, thereby resulting in an extremely expensive waste of power. Thus, a rocket engine with one solid mass of propellant, even if it incorporates thrust cancellation valves, does not provide good control over the resultant thrust produced thereby.

Therefore, it is the object of the subject invention to provide a solid propellant rocket engine which overcomes these disadvantages associated with prior solid propellant rocket engines.

It is a further object of this invention to provide a rocket engine with a plurality of solid propellant units disposed therein, the ignition of each one of which is completely controllable.

It is still a further object of this invention to provide a solid propellant rocket engine which affords control over the amount of fuel burned in the engine, the resultant thrust of the engine, and the vectoring of the resultant thrust.

Other objects, features and advantages of the subject invention will become apparent on reference to the succeeding detailed description and the drawings showing the preferred embodiment thereof, wherein:

FIGURE 4 is a schematic wiring diagram of the control system to ignite the different layers of solid propellant within the rocket engine and two control panel charts; and FIGURE 5 is an enlarged view of a detail of FIGURE 1.

In general, the preferred embodiment of this invention comprises a rocket engine containing a plurality of solid propellant units, the ignition of each one of which is completely controllable. The subject invention further provides a solid propellant rocket engine with a cluster of modified plug exhaust nozzles and a pair of thrust cancellation valves to provide complete control over thrust level and thrust vectoring.

Figure 1:
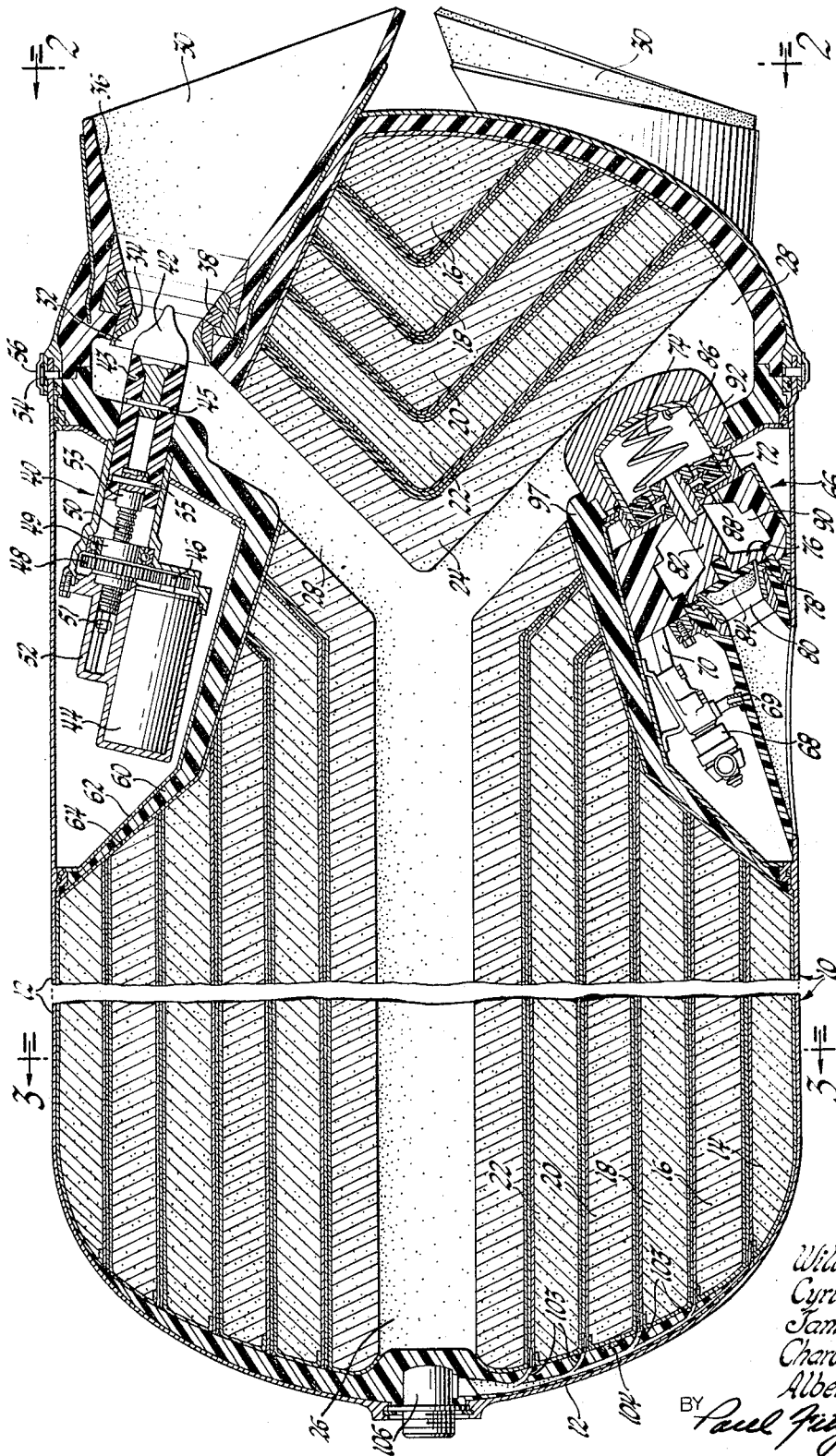
FIGURE 1 is a sectional view of the rocket engine and details thereof taken in the direction of arrows 1—1 in FIGURE 2.
Figure 2:
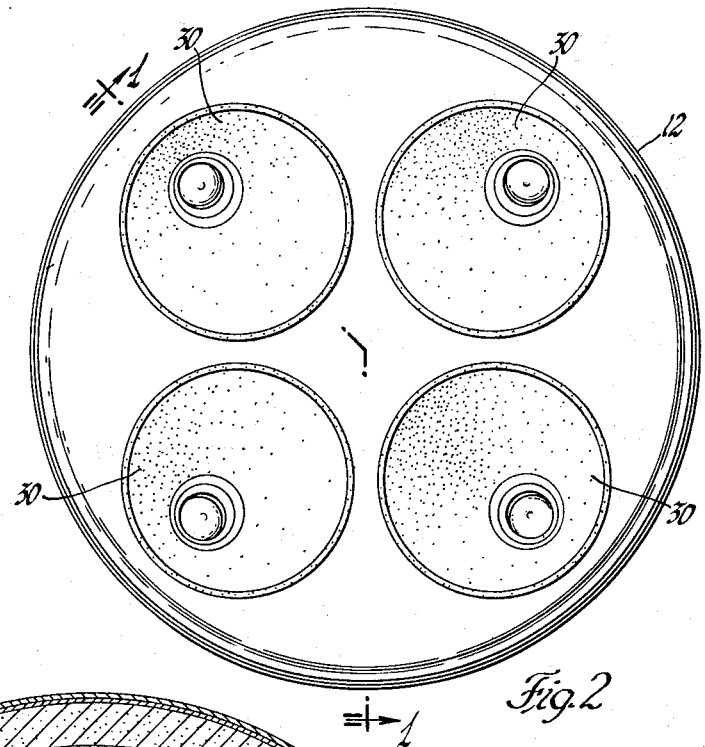
FIGURE 2 is a view taken in the direction of arrows 2—2 in FIGURE 1.
Figure 3:
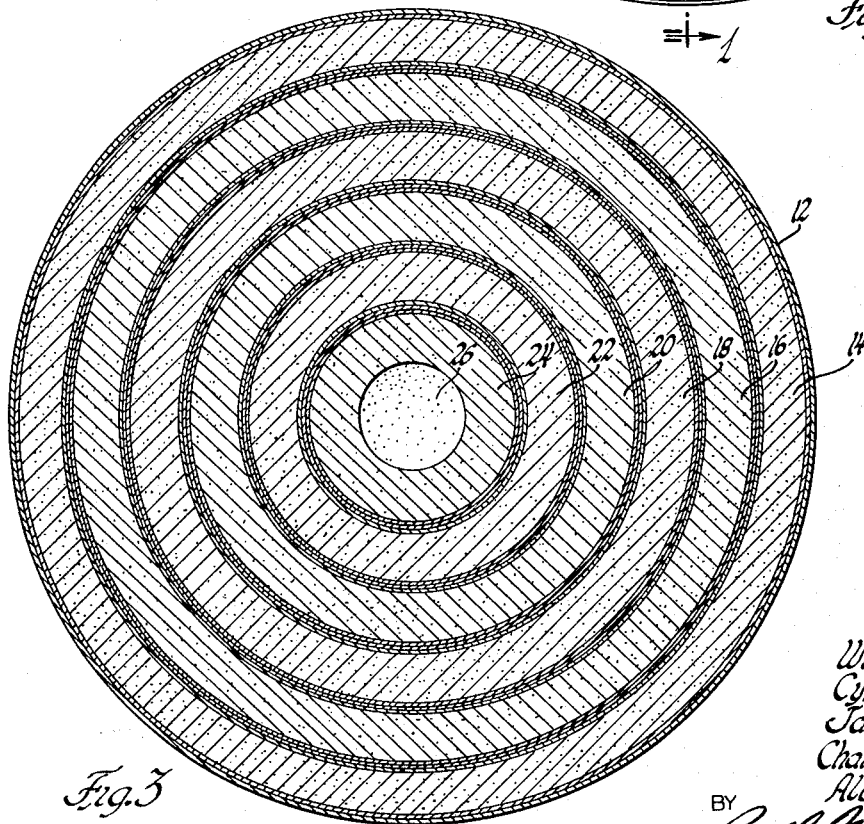
FIGURE 3 is a sectional view taken in the direction of arrows 3—3 in FIGURE 1.

More particularly, FIGURE 1 shows a rocket engine 10. It is to be noted that the rocket engine 10 may be a single unit sufficient by itself, or it may be incorporated as one stage of a multistage rocket structure. The rocket engine 10 is bounded by a cylindrical case 12, which may be steel. As seen in FIGURES 1 and 3, the rocket engine 10 has six separate more or less cylindrical units of solid propellant 14 through 24. A central gas passage 26 passes down through the center of the rocket engine 10 and diverges into a conical exit 28. This conical exit 28 is defined by fuel cones corresponding to the cylindrical units 14 through 24. Located at the rear end of the rocket engine and directly aft of the conical gas passage 28 are four converging-diverging exhaust nozzles 30. These exhaust nozzles 30 may be of any suitable type for withstanding the pressure and temperature developed within the rocket engine. In the preferred embodiment, the exhaust nozzle 30 has a converging portion 32, a throat 34 and a diverging exit cone 36. The throat of the exhaust nozzles 30 may embody any suitable structure, such as tungsten and carbon ring inserts 38. The various characteristics of these nozzles, such as contour, cant angle, and skew angle, will be determined by the operating conditions of the engine.

Each exhaust nozzle 30 is provided with a plug mechanism 40. The plug itself comprises a pointed head portion 42 which is made of tungsten and is pinned within a cylindrical body 43 of refrasil glass fiber plastic by a pin 45. In the preferred embodiment, the cylindrical body 43 is driven by a threaded screw shaft 50 which is driven through gears 46 and 48 by an electric actuator motor 44. The final drive gear 48 is a ball nut which engages the threaded screw shaft 50 through a group of circulating balls. The ball nut 48 is restricted from axial motion by a thrust bearing 49 and the threaded screw shaft 50 is restricted from rotational motion by an anti-rotation key 51. Thus the ball nut 48 rotates and drives the threaded screw shaft 50, without rotation against a bushing 53, which is pinned to the cylindrical body 43 by a pin means 55. This motion then moves the plug into the nozzle throat portion. The components of the nozzle plug actuator system are housed within the casing 52, which may be fixed to the main rocket engine casing 12 by any suitable means, such as a bolt 54 and spring nut 56. The refrasil glass fiber plastic material is also used as a liner 60 between the shell 62 around the plug actuator mechanism 40 and the outer shell 64 of this portion of the rocket engine.

The rocket is also provided with a pair of thrust cancellation valve devices, one of which is shown at 66 in FIGURE 1. The thrust cancellation valve is controlled by a solenoid-actuated pilot valve 68, which vents the power piston cavity 92 through a conduit 70 which enters the cavity 92 at the passage opening 86. The solenoid valve 68 is connected to the ambient air space by a vent tube 69. A power piston 72, housed within the cavity 92, is connected to a thrust cancellation port closure member 76, which upon the movement of the piston 72 is removed from its seated position at 78 to open the thrust cancellation port 80. The main body 82 of this thrust cancellation port closure member 76 is tungsten and the head portion 84 is a plastic insulation substance. A passage 88 connects the thrust cancellation cavity 90 with the piston cavity 92. A return spring 74 is disposed within the piston cavity 92 to restrict the motion of the piston 72. Two blast tube passages (not shown) lead into the chamber 90 and connect this chamber with the main rocket engine chamber.

During normal operation, combustion gases are admitted behind the piston 72 through the passage 88 thereby creating a force which will press the closure member 76 against its seat 78. When thrust cancellation is desired the solenoid 68 is energized to vent the power piston cavity 92 to space. Fluid pressure behind the piston 72 drops as the gases are allowed to escape through the conduit 70 to the solenoid valve 68 and then to space through vent tube 69. The resulting force imbalance will cause the closure member 76 to open against the return spring 74. Contact surfaces on the closure member 76 and the seat 78 will be made from tungsten and the thrust cancellation valve means will be sealed from the rocket engine chamber casing by a layer 97 of refrasil glass fiber plastic material.

The ignition of a section of the solid propellant is accomplished by passing electric current through a conducting film of pyrotechnic material. The heat generated ignites the film which ignites a larger quantity of nonconducting pyrotechnic material which then ignites the propellant. Fabrication details of the pyrotechnic materials, the inhibitor barrier, and the ignition leads are shown in FIGURE 5. Each of these barriers will consist of a layer of insulation of sufficient thickness to insulate the remainder of the propellant from the burning grain. This is shown as the inhibitor 94. Located adjacent to the inhibitor layer 94 is a layer of thermal barrier material 96. Transient heat transfer calculations indicate that a barrier thickness of .025 inch would be more adequate if coning of the rocket propellant layer does not occur; however, if propellant coning causes a tailoff exposure of 5 seconds insulation thickness of approximately 0.060 inch will be required, and proportionately higher thickness will be necessary if large coning effects are found to exist. The selection of this barrier thickness will be a function of the solid propellant used and the amount of pyrotechnic propellant in each of the layers. Behind the insulation, and applied directly to it, will be a layer of nonconducting pyrotechnic material 98. Located adjacent this nonconducting pyrotechnic will be a layer of surface conductive ignition film 100, which will be ignited automatically by the burning out of the previous propellant layer or which can be ignited manually, if desired. A layer of sustainer charge 102 (for example, propellant pellets contained in a thin layer of styrofoam) of increasing thickness toward the head of the rocket engine may be mounted on the conductive film ignition material 100. In preparation of the motor, the propellant in each section will be loaded, a smooth surface will be established, and an assembled barrier will be installed and bonded to the case. Following this, the next layer of propellant will be poured. It is estimated that in such a rocket engine approximately 2% of the total volume will be taken up by the barriers. Wires 103 to each thermal barrier will be carried through a plastic insulating material 104, which is located between the rocket motor case 12 and the inhibitor 94, to an electrical connector located in the upper rocket engine closure 106. Thus, the number of barriers used will be one less than the number of layers of propellant incorporated within the engine. Therefore, in the embodiment as shown in FIGURE 1 the number of barriers used will be five.

The ignition control system is shown in FIGURE 4, which depicts only the first three ignition circuits. Since the circuit is a repeating one, the full circuit required for the embodiment with six propellant layers as shown in FIGURE 1, will be the same as that shown in FIGURE 4 with the addition of three sections on the right hand end of the diagram. Each section is outlined in FIGURE 4 by dashed lines.

The ignition control system permits a section to be ignited automatically as the preceding section approaches burnout or to prohibit ignition as the preceding section burns out. For the latter case, subsequent reignition must be available on command. Interlocks are provided to prevent ignition of the wrong section and manual overrides are designed to bypass only one interlock at a time, always leaving at least one safety feature in the circuit. A detailed description of the operation of the ignition system follows:

The operating panel has a master switch, a three-position selector switch, a three-position manual ignite switch for each propellant layer and a pilot light for each propellant layer to indicate which layers have been ignited. To ignite the first section the motor switch is closed. After a delay of about 5 seconds for charging the firing capacitor, the selector switch is turned to IGNITE and held there and manual switch one is turned to position ONE and held there. When the pilot light indicates successful ignition, both switches can be released. The selector switch will return to CONTINUE BURN and manual switch one will return to OFF. Succeeding sections will ignite in order until the selector switch is turned to TERMINATE. This will prevent ignition of any additional sections. Reignition requires that the selector switch be turned to IGNITE and held there while the manual switch is moved first to position ONE and then to position TWO. When the pilot light indicates reignition, both switches can be released and succeeding stages will ignite automatically. However, if reignition does not occur, the system should be shut down, and when the cause of trouble has been corrected, the burned out conductive film igniters must be bypassed and the system recycled. Start of the recycle will be as for normal start, but each successive burned out section and the first live section must be initiated by turning and holding the selector switch on IGNITE and then turning the second manual switch momentarily to position ONE and then to position TWO. When the pilot light goes on, both switches should be released. A five second capacitor recharge period must be allowed between successive section ignitions, and after the first live section has been ignited, ignition of succeeding sections will be automatic.

For the electrical sequencing of the ignition system, refer to the schematic wiring diagram and the charts as shown in FIGURE 4. The three-position selector switch, the positions of which are shown in one of the charts, has to contacts, CONTINUE BURN CB and IGNITE I. In the TERMINATE position, neither contact is closed. In the CONTINUE BURN position, the CONTINUE BURN contact CB is closed and the IGNITE contact I is open. In the IGNITE position, both the CONTINUE BURN CB and the IGNITE I contacts are closed. The switch is spring returned to the CONTINUE BURN position from the IGNITE position. The other chart shows the positions and contacts for the manual ignite switches. The manual ignite switches have three positions, OFF, ONE, and TWO. It is to be noted that these three-position manual switches are spring-returned to the OFF position from either position ONE or TWO. The chart shows the contacts for section members 1 and 2 to show the transition for manual ignition between these two sections. It is seen that when the manual ignite switch is in the OFF position both contacts 1—1 and 2—2 are in the open position. In position ONE, the contact 1—1 is closed and the contact 2—2 is open. In position TWO the contact 1—1 is open and the contact 2—2 is closed. It is to be remembered that these contact members refer to the corresponding section or propellant layer to be ignited.

Referring to the schematic wiring diagram of FIGURE 4, it is seen that closing the master switch MS allows the capacitor C to charge through the current limiting resistor CLR. The circuit contains two main busses 107 and 108 across which the voltage of the source B is applied to each succeeding section. When the first section is to be ignited, the selector switch will be manually thrown to the IGNITE position, thereby closing the normally open contacts CB and I. The manual IGNITE switch is then thrown to position 1 which closes contact 1—1. Now, since contacts 1—1 and I have been closed by the manual switches and since contacts 120a and 130a are normally closed, the relay 110 is energized. Relay 110 then closes its contact 110a, thereby energizing relay 120 and the section 1 ignition CFI–1. Relay 120 then opens its normally closed contact 120a and closes its normally open contacts 120b and 120c. This provides a parallel circuit for relay 110 and energizes relay 130 and lights pilot light PL–1. Relay 130 then opens its normally closed contact 130a and closes its normally open contact 130b thereby providing a holding circuit which arms the ignition circuit for section 2. As the capacitor C discharges, relays 110 and 120 drop out. But since relay 130 is connected directly with the source B across the busses 107 and 108 it remains in the circuit and the igniter CFI–1 cannot be energized again, even if the two switch contacts I and 1—1 are reclosed.

If the selector switch is left on CONTINUE BURN as section 1 nears burn out, ion gap switches IG1–1 and IG1–2 begin to conduct as the gases contained in these switches are responsive to the heat caused by the voltage placed across them and ionize thereby forming a path for current. When IG1–2 becomes closed, a current will flow through the normally closed contacts 220a and 230a, and energize relays 210 and 215. Relay 210 will then close its normally open contact 210a and relay 215 will then close its normally open contact 215a thereby forming a path for current to flow through switch IG1–1 to energize relay 220 and section 2 ignition CFI–2. Thus it is seen that if the selector switch is left on the CONTINUE BURN position section 2 will be automatically ignited as section 1 approaches burn out. Alternatively, if the selector switch is not left on CONTINUE BURN the manual IGNITE switch must be thrown to position 2, thereby closing normally open contact 2—2 which will connect the circuit to CFI–2. Once energized, relay 220 will open its normally closed contact 220a and close its normally open contact 220b thereby providing a parallel circuit for relay 210. Relay 220 will also close its normally open contact 220c thereby energizing relay 230 which lights the pilot light PL–2. Relay 230 will then open its normally closed contact 230a and close its normally open contact 230b thereby providing a holding circuit for section 2 arming the ignition circuit for section 3. As in section 1, when the path C nears discharge, the relays 210, 215, and 220 drop out of the circuit.

If the elector switch is turned to the TERMINATION during the burning of section 1, contact CB will open and the section 2 igniter CFI–2 cannot be energized, and the second section will not ignite. To ignite the second section in such a case requires not only that contact CB be reclosed, but also that the ion gap switches IG1–1 and IG1–2 be bypassed, as the gases contained therein will not be ionized and hence the switches will not conduct. Thus to ignite section 2, the selector switch is placed in the IGNITE position thereby closing both the CONTINUE BURN CB and IGNITE I contacts, and the manual ignite switch will be moved to position ONE, thereby closing contacts 2–1 which provide a path to energize relays 210 and 215. Moving the manual ignite switch to position TWO closes contact 2—2 which allows current to reach the section 2 igniter CFI–2 and thereby completes the ignition circuit for section 2. As noted in the drawing, the manual ignite switch returns to the OFF position and the selector switch returns to the CONTINUE BURN position, thereby leaving the CONTINUE BURN CB contact closed and allowing the ignition to progress in the normal manner as described previously. It should remain clear that the ignition of succeeding sections will be identical to that of the ignition of section 2, regardless of the number of sections, and that a further discussion of such ignition will be repetitive and unnecessary. The designations of the components are placed on the drawing of FIGURE 4 so that the ignition of a given section may be stated merely by the substitution of the numbers of that section for the corresponding numbers of section 2 in the preceding detailed discussion.

It might be added that in the event of a major shutdown in which the master switch MS has been opened, the burned out CFI (ignition) units must be by-passed so that the normal sequencing can be reinitiated by the operation of the current sensitive relays. However, the ion gap switches in the burned out sections will be inoperative, and therefore, for each burned out section, the sequencing operation must be the same as the procedure for a re-ignition.

From the preceding description, it should be clear that the subject invention overcomes the disadvantages previously stated as being associated with known solid propellant rocket engines. The subject invention provides a complete solid propellant rocket engine which is sufficient by itself or which may be used as one stage of a multistage rocket vehicle. It should be apparent that due to its exceptional control over thrust and velocity the subject unit probably would be used as an upper stage in a multistage rocket vehicle. Essentially, the subject rocket unit is a one stage solid propellant rocket engine with the ability to fire six times. Thus, if it were used as an upper stage in a multistage rocket vehicle it would provide an excellent device for controlling and correcting the velocity of the vehicle once it has reached orbit or attained its desired path in space.

In summary, the use of the six separate layers of solid propellant enables the engine to be fired six different times and to be fired at any desired intervals, regardless of the time element between stage firings. The use of the cancellation valves on this engine give further control over the thrust level of the engine during each of the separate firings and the use of the plugs, which are adapted to move into and restrict the exhaust gases passing through the exhaust nozzles, provides an accurate means of thrust vector control for the vehicle. It should be apparent that these plugs used in coordination with a cluster of nozzles will provide control over the pitch, yaw, and roll vectors of the vehicle. This control is provided by varying the flow of exhaust gas through opposite or adjacent pairs of exhaust nozzles depending on the type of vector control desired. Thus, it is seen that the subject invention provides a solid propellant rocket engine which affords exceptional control over the thrust level, thrust vectoring, and the quantity of fuel consumed.

Although the subject invention has been illustrated with respect to its use in a solid propellant rocket engine, it should be clear to those skilled in the arts to which it pertains that it could be adapted to any multistage combustion engine, and that many changes and modifications may be made thereto without departing from the scope of the invention.

We claim:

1. A reignitable, solid propellant rocket engine including means for thrust vector control and thrust level control, said engine comprising:
   an outer casing;
   a cluster of exhaust nozzles attached to said casing at the lower extremity thereof;
   a plug means for each of said exhaust nozzles to control the flow of exhaust gases through each said nozzle;
   thrust cancellation means positioned in said rocket engine casing and being operable to bleed exhaust gases from said rocket engine;
   a plurality of layers of solid propellant disposed within said casing;
   a plurality of layers of combustion inhibitor between said layers of solid propellant;
   a plurality of ignition means positioned between said layers of solid propellant;
   and means to actuate said ignition means.

2. A reignitable, solid propellant rocket engine including means for thrust vector control and thrust level control, said engine comprising:
- a cylindrical casing;
- a cluster of exhaust nozzles attached to said cylindrical casing at the lower extremity thereof;
- a plug means for each of said exhaust nozzles to control the flow of exhaust gases through each said exhaust nozzle, each said plug means including a tungsten head portion which is pinned within a cylindrical body and which is slidable into the throat portion of each said nozzle;
- thrust cancellation means positioned in said rocket engine casing and being operable to bleed exhaust gases from said rocket engine;
- a plurality of layers of solid propellant disposed within said casing;
- a plurality of layers of combustion inhibitor positioned between said layers of solid propellant;
- a plurality of ignition means positioned between said layers of solid propellant;
- and means to actuate said ignition means.

3. A reignitable, solid propellant rocket engine including means for thrust vector control and thrust level control, said engine comprising:
- a cylindrical casing;
- a cluster of convergent-divergent exhaust nozzles attached to said cylindrical casing at the lower extremity thereof;
- a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;
- thrust cancellation means positioned in said rocket engine casing and being operable to bleed exhaust gases from said rocket engine;
- a plurality of layers of solid propellant disposed within said casing;
- a plurality of layers of combustion inhibitor positioned between said layers of solid propellant;
- a plurality of ignition means positioned between said layers of solid propellant;
- and means to actuate said ignition means.

4. A reignitable, solid propellant rocket engine including means for thrust vector control and thrust level control, said engine comprising:
- a cylindrical casing;
- a cluster of convergent-divergent exhaust nozzles attached to said cylindrical casing at the lower extremity thereof;
- a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;
- thrust cancellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and the withdrawal of said closure means from said thrust cancellation port;
- a plurality of layers of solid propellant disposed within said casing;
- a plurality of layers of combustion inhibitor positioned between said layers of solid propellant;
- a plurality of ignition means positioned between said layers of solid propellant;
- and means to actuate said ignition means.

5. A reignitable, solid propellant rocket engine including means for thrust vector control and thrust level control, said engine comprising:
- a cylindrical casing;
- a cluster of convergent-divergent exhaust nozzles attached to said cylindrical casing at the lower extremity thereof;
- a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;
- a thrust cancellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and the withdrawal of said closure means from said thrust cancellation port;
- a plurality of layers of solid propellant disposed within said casing;
- a plurality of layers of combustion inhibitor located between said layers of solid propellant to prevent the ignition of one layer of said solid propellant upon the combustion of an adjacent layer;
- a plurality of ignition means positioned between said layers of solid propellant;
- and means to actuate said ignition means.

6. A reignitable, solid propellant rocket engine including means for thrust vector control and thrust level control, said engine comprising:
- a cylindrical steel casing;
- a cluster of convergent-divergent exhaust nozzles attached to said cylindrical casing at the lower extremity thereof;
- a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;
- thrust concellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and withdrawal of said closure means from said thrust cancellation port;
- a plurality of layers of solid propellant disposed within said steel casing;
- a plurality of layers of combustion inhibitor located between said layers of solid propellant to prevent the ignition of one layer of said solid propellant upon the combustion of an adjacent layer;
- a plurality of ignition means positioned between said layers of solid propellant, each said ignition means including a layer of thermal barrier material adjacent to said inhibitor layer to insulate said ignition means from the heat of combustion of the previously combusted layer of said solid propellant, a layer of nonconductive pyrotechnic material, a layer of conductive pyrotechnic material, and an ignition lead wire being received within said conductive pyrotechnic layer of said ignition means;

and means to actuate said ignition means.

7. A reignitable, solid propellant rocket engine including means for thrust vector control and thrust lever control, said engine comprising:

a cylindrical steel casing;

a cluster of convergent-divergent exhaust nozzles attached to said cylindrical casing at the lower extremity thereof;

a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;

thrust cancellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and withdrawal of said closure means from said thrust cancellation port;

a plurality of layers of solid propellant disposed within said steel casing;

a plurality of layers of combustion inhibitor located between said layers of solid propellant to prevent the ignition of one lawer of said solid propellant upon the combustion of an adjacent layer;

a plurality of ignition means positioned between said layers of solid propellant, each said ignition means including a layer of thermal barrier material adjacent to said inhibitor layer to insulate said ignition means from the heat of combustion of the previously combusted layer of said solid propellant, a layer of nonconductive pryotechnic material, a layer of conductive pyrotechnic material, a layer of sustainer material directly adjacent to the next layer of said solid propellant to be ignited, and an ignition lead wire being received within said conductive pyrotechnic layer of said ignition means;

and means to actuate said ignition means.

8. A reignable, solid propellant rocket engine including means for thrust vector control and thrust level control, said engine comprising:

a cylindrical steel casing;

a cluster of convergent-divergent exhaust nozzles attached to said cylindrical casing at the lower extremity thereof;

a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means beings driven by a screw shaft which is moved by a rotating ball nut gear actuated by an electric motor;

thrust cancellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and withdrawal of said closure means from said thrust cancellation port;

a plurality of layers of solid propellant disposed within said steel casing;

a plurality of layers of combustion inhibitor located between said layers of solid propellant to prevent the ignition of one layer of said solid propellant upon the combustion of an adjacent layer;

a plurality of ignition means positioned between said layers of solid propellant, each said ignition means including a layer of thermal barrier material adjacent to said inhibitor layer to insulate said ignition means from the heat of combustion of the previously combusted layer of said solid propellant, a layer of nonconductive pyrotechnic material, a layer of conductive pyrotechnic material, a layer of sustainer material directly adjacent to the next layer of said solid propellant to be ignited; and an ignition lead wire being received within said conductive pyrotechnic layer of said ignition means;

and means to actuate said ignition means, said actuation means comprising an electrical source which sends an electric current through said ignition lead wires to said conductive pyrotechnic material within said ignition means, said current igniting said conductive pyrotechnic material thereby resulting in the ignition of the layer of said solid propellant adjacent thereto.

9. A reignitable, solid propellant rocket engine including means for thrust vector control and thrust level control, said engine comprising:

a cylindrical steel casing;

a cluster of convergent-divergent exhaust nozzles attached to said cylindrical casing at the lower extremity thereof;

a plug means for each of said exhaust nozzles to control the flow of exhaust gases through each said exhaust nozzle, each said plug means including a tungsten head portion which is pinned within a cylindrical body and which is slidable into the throat portion of each said nozzle, and said plug means being driven by a screw shaft which is moved by a rotating ball nut gear actuated by an electric motor;

thrust cancellation means positioned in said rocket engine casing and being operable to bleed exhaust gases from said rocket engine including a thrust cancellation port closure member, a piston attached to said closure member and disposed within a cavity exposed to the rocket engine exhaust gases, a spring member restricting the motion of said piston, a solenoid valve to vent said piston cavity to cause a force imbalance on said piston thereby resulting in the movement of said piston and withdrawal of said closure means from said thrust cancellation port;

a plurality of cylindrical layers of solid propellant disposed within said steel casing;

a plurality of layers of combustion inhibitor located between said layers of solid propellant to prevent the ignition of one layer of said solid propellant upon the combustion of an adjacent layer;

a plurality of ignition means positioned between said layers of solid propellant, each said ignition means including a layer of thermal barrier material adjacent to said inhibitor layer to insulate said ignition means from the heat of combustion of the previously combusted layer of said solid propellant, a layer of nonconductive pyrotechnic material, a layer of conductive pyrotechnic material, a layer of sustainer material directly adjacent to the next layer of said solid propellant to be ignited, and an ignition lead wire being received within said conductive pyrotechnic layer of said ignition means;

and means to actuate said ignition means, said actuation means comprising an electrical source which sends an electric current through said ignition lead wires to said conductive pyrotechnic material within said ignition means, said current igniting said conductive pyrotechnic material thereby resulting in the ignition of the layer of said solid propellant adjacent thereto.

10. A reignitable solid propellant rocket engine comprising:
- a cylindrical casing;
- a cluster of convergent-divergent exhaust nozzles attached to said cylindrical casing at the lower extremity thereof;
- a plurality of layers of solid propellant disposed within said cylindrical casing;
- a plurality of layers of combustion inhibitor located between said layers of said propellant to prevent the ignition of one layer of said solid propellant upon the combustion of an adjacent layer;
- a plurality of ignition means positioned between said layers of solid propellant, each said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, and an ignition lead wire being received within said conductive pyrotechnic layer of said ignition means;
- and means to actuate said ignition means.

11. A reignitable solid propellant rocket engine comprising:
- a cylindrical casing;
- a cluster of convergent-divergent exhaust nozzles attached to said cylindrical casing at the lower extremity thereof;
- a plurality of layers of solid propellant disposed within said cylindrical casing;
- a plurality of layers of combustion inhibitor located between said layers of said propellant to prevent the ignition of one layer of said solid propellant upon the combustion of an adjacent layer;
- a plurality of ignition means positioned between said layers of solid propellant, each said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, a layer of sustainer material directly adjacent to the next layer of said propellant to be ignited, and an ignition lead wire being received within said conductive pyrotechnic layer of said ignition means;
- and means to actuate said ignition means.

12. A reignitable solid propellant rocket engine comprising:
- a cylindrical casing;
- a cluster of convergent-divergent exhaust nozzles attached to said cylindrical casing at the lower extremity thereof;
- a plurality of layers of solid propellant disposed within said cylindrical casing;
- a plurality of layers of combustion inhibitor located between said layers of said propellant to prevent the ignition of one layer of said solid propellant upon the combustion of an adjacent layer;
- a plurality of ignition means positioned between said layers of solid propellant, each said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, a layer of sustainer material directly adjacent to the next layer of said propellant to be ignited, and an ignition lead wire being received within said conductive pyrotechnic layer of said ignition means;
- and means to actuate said ignition means, said actuation means comprising an electrical source which sends an electric current through said ignition lead wires to said conductive pyrotechnic material within said ignition means, said current igniting said conductive pyrotechnic material thereby resulting in the ignition of the layer of said solid propellant adjacent thereto.

13. A reignitable solid propellant rocket engine comprising:
- a cylindrical casing;
- a cluster of convergent-divergent exhaust nozzles attached to said cylindrical casing at the lower extremity thereof;
- a plurality of cylindrical layers of solid propellant disposed within said cylindrical casing;
- a plurality of layers of combustion inhibitor located between said layers of said propellant to prevent the ignition of one layer of said solid propellant upon the combustion of an adjacent layer;
- a plurality of ignition means positioned between said layers of solid propellant, each said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, a layer of sustainer material directly adjacent to the next layer of said propellant to be ignited, and an ignition lead wire being received within said conductive pyrotechnic layer of said ignition means;
- and means to actuate said ignition means, said actuation means comprising an electrical source which sends an electric current through said ignition lead wires to said conductive pyrotechnic material within said ignition means, said current igniting said conductive pyrotechnic material thereby resulting in the ignition of the layer of said solid propellant adjacent thereto.

14. An ignition system for a multilayer solid propellant engine comprising:
- a layer of combustion inhibitor located between two adjacent layers of said solid propellant disposed within said engine to prevent the ignition of one of said layers of solid propellant upon the combustion of the other of said layers of solid propellant;
- ignition means placed between said adjacent layers of solid propellant, said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, a layer of sustainer material directly adjacent to the next layer of solid propellant to be ignited, and an ignition lead wire being received within said conductive pyrotechnic layer of said ignition means;
- and means to actuate said ignition means.

15. An ignition system for a multilayer solid propellant engine comprising:
- a layer of combustion inhibitor located between two adjacent layers of said solid propellant disposed within said engine to prevent the ignition of one of said layers of solid propellant upon the combustion of the other of said layers of solid propellant;
- ignition means placed between said adjacent layers of solid propellant, said ignition means including a layer of thermal barrier material adjacent to said inhibitor layer to insulate said ignition means from the heat of combustion of said previously combusted layer of solid propellant, a layer of nonconductive pyrotechnic material, a layer of conductive pyrotechnic material, a layer of sustainer material directly adjacent to the next layer of solid propellant to be ignited, and an ignition lead wire being received within said conductive pyrotechnic layer of said ignition means;

and means to actuate said ignition means, said actuation means comprising an electrical source which sends an electric current through said ignition lead wires to said conductive pyrotechnic material within said ignition means, said current igniting said conductive pyrotechnic material thereby resulting in the ignition of the layer of said solid propellant adjacent thereto.

References Cited by the Examiner

UNITED STATES PATENTS

| | | | |
|---|---|---|---|
| 2,956,401 | 10/1960 | Kane | 60—39.47 X |
| 3,099,959 | 8/1963 | Bowersett. | |
| 3,122,884 | 3/1964 | Grover et al. | 60—39.47 X |
| 3,128,599 | 4/1964 | Carr | 60—35.6 |
| 3,128,600 | 4/1964 | Oldham | 60—35.6 |
| 3,142,959 | 8/1964 | Klein | 60—35.6 |
| 3,150,486 | 9/1964 | Hollstein et al. | 60—35.54 |
| 3,196,610 | 7/1965 | Anderson | 60—35.54 |

MARK NEWMAN, *Primary Examiner.*

CARLTON R. CROYLE, *Examiner.*